(No Model.)

J. W. MARSH & H. W. FISHER.
CUTTING NIPPERS.

No. 450,174. Patented Apr. 14, 1891.

WITNESSES:
Darwin S. Wolcott
F. E. Gaither

INVENTOR,
Joseph W. Marsh
Henry W. Fisher
by George H. Christy
Att'y.

United States Patent Office.

JOSEPH W. MARSH AND HENRY W. FISHER, OF PITTSBURG, PENNSYLVANIA ASSIGNORS TO THE STANDARD UNDERGROUND CABLE COMPANY, OF SAME PLACE.

CUTTING-NIPPERS.

SPECIFICATION forming part of Letters Patent No. 450,174, dated April 14, 1891.

Application filed May 23, 1890. Serial No. 352,891. (No model.)

*To all whom it may concern:*

Be it known that we, JOSEPH W. MARSH and HENRY W. FISHER, citizens of the United States, residing at Pittsburg, in the county of Allegheny and State of Pennsylvania, have invented or discovered certain new and useful Improvements in Cutting-Nippers, of which improvements the following is a specification.

The invention described herein relates to certain improvements in cutting pliers or nippers, and has for its object a construction whereby the depth of cut or the penetration of the blades may be regulated. Heretofore it has been attempted to effect such regulation by means of stops arranged to regulate the movement of the handles or jaws toward each other; but such construction is ineffective, for the reason that one of the blades might be forced into the object to be cut a distance approximately equal to the amount which both blades are desired to cut, the other blade simply indenting the part with which it is in contact.

This invention consists, generally stated, in a construction whereby the depth of cut of each blade is independently regulated, and whereby one blade having effected its cut will serve as a bearing or anvil for supporting the material, while the opposite blade effects its function.

Figure 1:
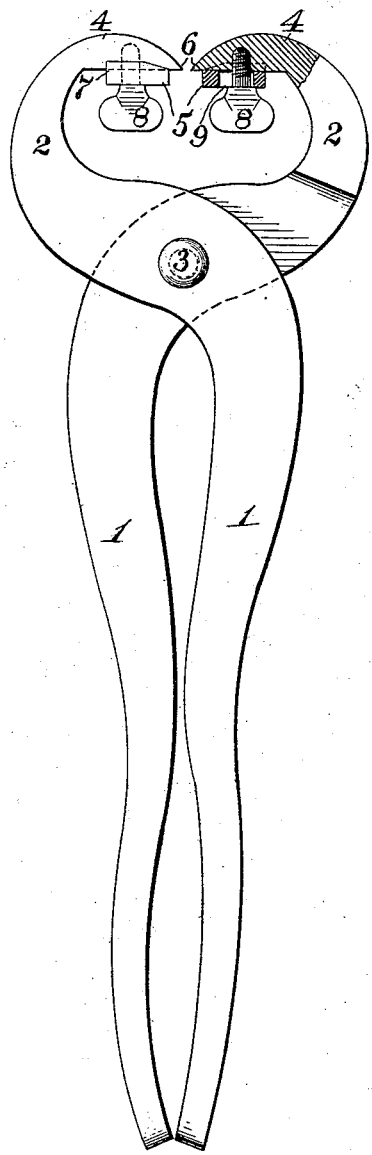
Figure 2:
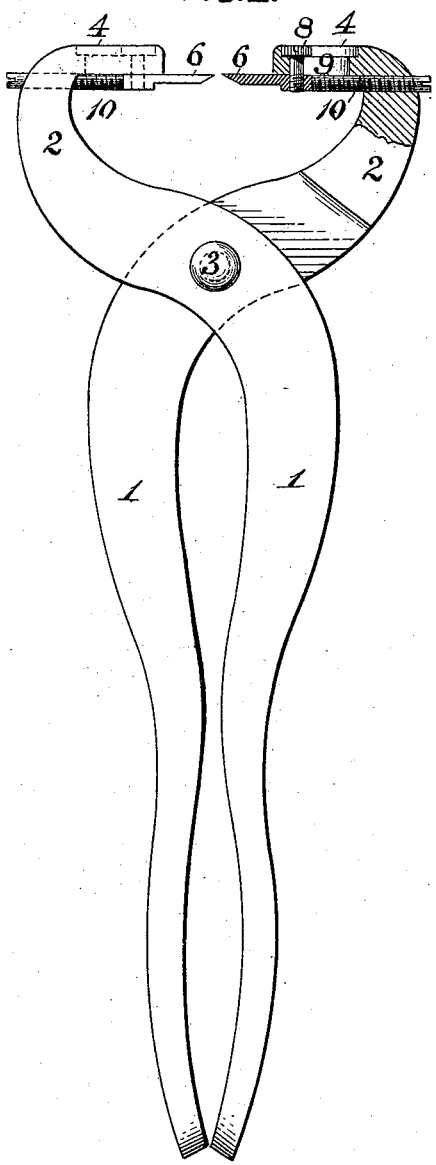

In the accompanying drawings, forming a part of this specification, Figure 1 is a view in side elevation of a pair of nippers having our improvement applied thereto, and Fig. 2 is a similar view of a modification of the construction shown in Fig. 1.

In the practice of our invention the nippers shown in Figs. 1 and 2 are constructed, as regards their handles 1 and the parts 2 of the jaws adjacent to the pivot-pin 3, in the usual or any suitable manner. The portions 4 of the jaws project inwardly toward each other, and have their inner faces or walls made straight or plane, as shown in Fig. 1, for the reception of the blocks 5, while their outer walls are beveled so as to form the cutters 6. The blocks are provided on their ends with ribs 7, adapted to bear on the edges of the cutting-blades and serve to prevent any angular displacement of the blocks while in use or during adjustment. Thumb-screws 8 are employed for holding the blocks in any desired position, the stems of such screws passing through slots 9 in the blocks and screwing into the blades.

In using the tool shown in Fig. 1 the blocks or stops are adjusted toward or away from the edges of the cutters in accordance with the depth of cut desired. It will be readily understood that neither of the blades or cutters will have any cutting action after the stops having a bearing upon the article being cut, and in case one blade cuts before the other its action will be stopped and the block thereon will serve as an anvil for the other blade.

In Fig. 2 the portions 4 of the jaws are constructed to serve as stops and the blades or cutters 6 are adjustably attached to the rear walls thereof. In this construction the slot 9 is preferably formed in the portions 4 of the jaws, the clamping-screws 8 passing through the slot and screwing into the blades or cutters. In order to prevent any accidental slipping of the blades or cutters while in use it is preferred to employ screws 10, passing through threaded holes in the jaws and bearing at their inner ends against the rear edges of the blades or cutters.

We claim herein as our invention—

1. In a pair of cutting-nippers, the combination of two jaws movable toward and from each other, each jaw being provided with a cutter and a stop arranged in such relation to the cutter as to limit its cutting action, one of said last-named elements being adjustable with reference to the other, substantially as set forth.

2. In a pair of cutting-nippers, the combination of two jaws movable toward and from each other, each jaw being provided with an adjustable cutter, and a stop having such arrangement in relation to the cutter as to limit its cutting action, substantially as set forth.

In testimony whereof we have hereunto set our hands.

JOSEPH W. MARSH.
HENRY W. FISHER.

Witnesses:
C. S. CRAWFORD,
DARWIN S. WOLCOTT.